United States Patent [19]

Shippy

[11] Patent Number: 5,822,755
[45] Date of Patent: Oct. 13, 1998

[54] DUAL USAGE MEMORY SELECTIVELY BEHAVING AS A VICTIM CACHE FOR L1 CACHE OR AS A TAG ARRAY FOR L2 CACHE

[75] Inventor: David Shippy, Houston, Tex.

[73] Assignee: International Business Machines Corporation, Armonk, N.Y.

[21] Appl. No.: 591,921

[22] Filed: Jan. 25, 1996

[51] Int. Cl.⁶ .................................................. G06F 12/08
[52] U.S. Cl. .......................................... 711/118; 711/138
[58] Field of Search ...................... 395/365, 445

[56] References Cited

U.S. PATENT DOCUMENTS

| | | | |
|---|---|---|---|
| 4,117,469 | 9/1978 | Levine | 395/175 |
| 4,912,630 | 3/1990 | Cochroft, Jr. | 364/200 |
| 5,067,078 | 11/1991 | Talgam et al. | 395/403 |
| 5,261,066 | 11/1993 | Jouppi et al. | 395/449 |
| 5,345,576 | 9/1994 | Lee et al. | 395/425 |
| 5,377,345 | 12/1994 | Chang et al. | 395/425 |
| 5,398,325 | 3/1995 | Chang et al. | 395/425 |
| 5,410,669 | 4/1995 | Biggs et al. | 395/445 |
| 5,574,875 | 11/1996 | Stansfield et al. | 395/403 |
| 5,586,293 | 12/1996 | Baron et al. | 395/445 |

OTHER PUBLICATIONS

Short, Kenneth, "Microprocessors and Programmable Logic", Prenctice–Hall, Inc., p. 8, last paragraph, 1987.

*Primary Examiner*—Tod R. Swann
*Assistant Examiner*—Felix B. Lee
*Attorney, Agent, or Firm*—Sawyer & Associates; Mark E. McBurney

[57] ABSTRACT

A microprocessor architecture including a first cache memory disposed on-chip for storing data along with an associated on-chip tag memory. A second memory is provided on-chip for storing data in a first mode of operation and for storing tags relating to the contents of a second cache memory in a second mode of operation. The mode of operation is set by control logic. The mode is selected by setting a bit in a mode control register. When the bit is set, the control logic changes the system from a first mode in which the second memory serves as additional on-chip cache memory to a second mode in which the second memory stores tags for an external level 2 cache memory. The invention provides a flexible cache structure in which increased on-chip cache is provided or tag memory area is provided for an off-chip level 2 cache.

12 Claims, 6 Drawing Sheets

DUAL USAGE MEMORY SELECTIVELY BEHAVING AS A VICTIM CACHE FOR L1 CACHE OR AS A TAG ARRAY FOR L2 CACHE

FIELD OF THE INVENTION

The present invention relates to computing systems. More specifically, the present invention relates to systems and techniques for providing on-chip and off-chip cache memory for microprocessors and the like.

BACKGROUND OF THE INVENTION

Computers generally include a microprocessor which processes data provided via a bus or a storage medium in accordance with instructions fetched from a read only memory (ROM) and either places the processed data on the bus or stores the data in a storage area such as a random access memory (RAM). Intermediate computational data may be stored in a cache memory. Cache memory is random access memory provided for the purpose of storing intermediate data. The contents of cache memory are stored in a separate area of memory referred to as "tag" memory.

For optimal performance, the cache and tag memories should be stored 'on-chip', on the same substrate or 'chip' as the microprocessor.

The ever-increasing performance requirements on computers is driving the demand for larger cache memory. As cache size increases, there must be a corresponding increase in the size of associated tag memory. High performance chip microprocessors, for example need large second level caches (L2 cache). The L2 cache is typically located between the smaller on-chip level 1 caches (L1 cache) and the main memory. Due to the size of the L2 cache, it is typically located 'off-chip', external to the microprocessor. Also, due to size requirements, the tags for the L2 cache are also located external to the microprocessor.

Unfortunately, there is typically some performance degradation associated with the off-chip access of tag memory. In addition, off-chip tags limit the amount of associativity that can be included in the L2 cache. Many important benchmarks have shown that associativity has a greater effect on performance than the size of the level two cache. Further, off-chip tags consume more power due to the high speed driver requirements of same.

The apparent solution of simply locating the L2 tag on-chip is problematic because for systems which do not need an L2 cache, the silicon area dedicated to the L2 tag is wasted.

Hence, there is a need in the art for a microprocessor architecture having internal level two cache tag area which is not wasted when the level two cache is not used.

SUMMARY OF THE INVENTION

The need in the art is addressed by the microprocessor architecture of the present invention. The inventive architecture includes a first cache memory disposed on-chip for storing data along with an associated on-chip tag memory. A novel of the invention is the provision of a second memory on-chip for storing data in a first mode of operation and for storing information relating to the contents of a second cache memory in a second mode of operation. The mode of operation is set by control logic.

In a particular implementation, the mode is selected by setting a bit in a mode control register. When the bit is set, the control logic changes the system from a first mode in which the second memory serves as additional on chip cache memory to a second mode in which the second memory stores tags for an external level 2 cache memory.

Hence, the invention provides a flexible cache structure in which increased on-chip cache is provided or tag memory area is provided for an off-chip level 2 cache. Thus, when the external level 2 cache is not present, the silicon area allocated for level 2 tags is efficiently used as additional on-chip cache instead of being wasted.

BRIEF DESCRIPTION OF THE DRAWINGS

FIGS. 2, 2A, 2B, and 2C show a detailed implementation of the microprocessor architecture of the present invention.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof.

Figure 1:
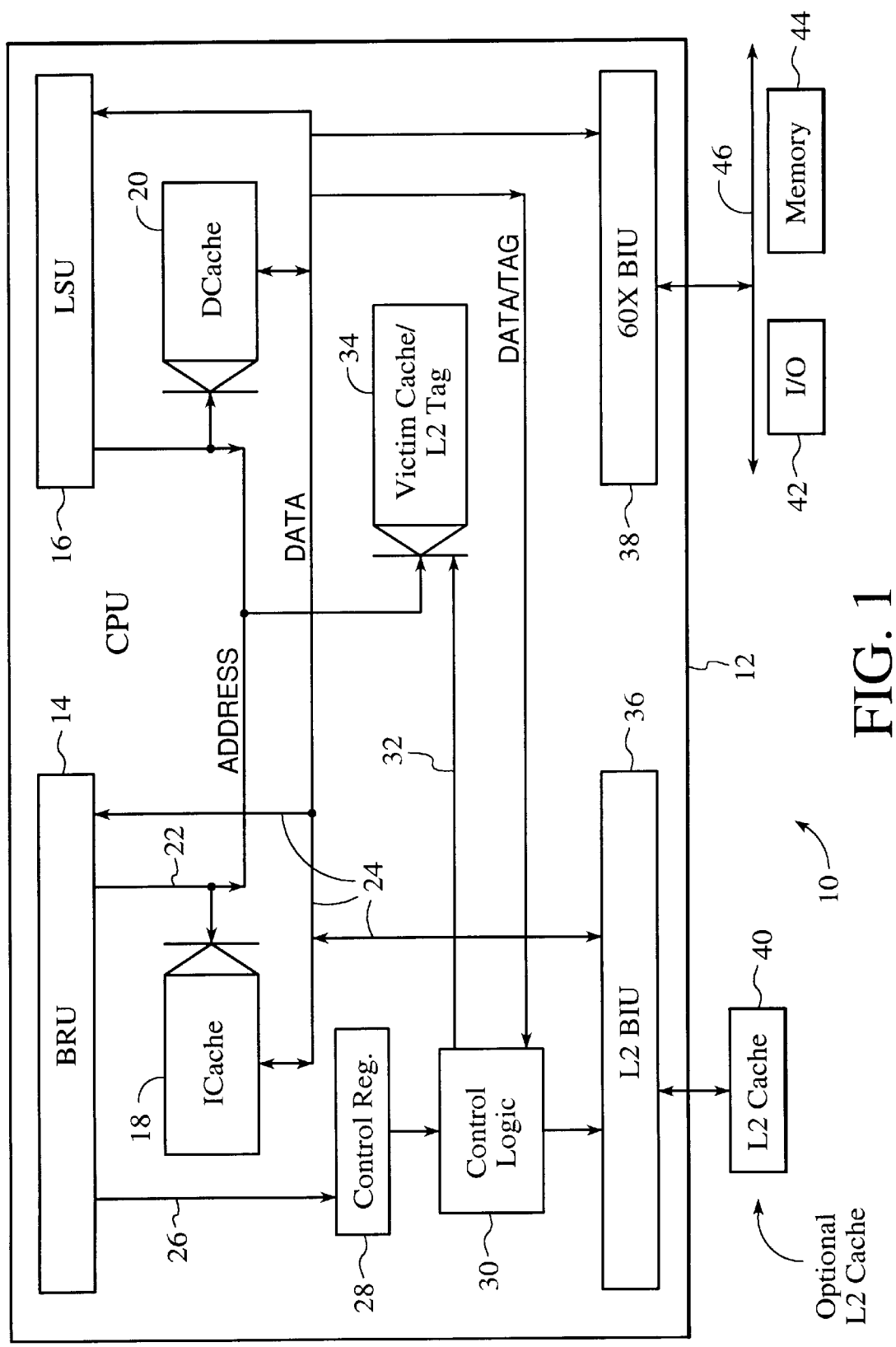
FIG. 1 is a simplified block diagram of the microprocessor architecture of the present invention.

FIG. 1 is a simplified block diagram of the microprocessor architecture of the present invention. The microprocessor 10 is disposed on a substrate 12 and includes a conventional branch instruction fetch unit (BRU) 14 and a conventional load store unit (LSU) 16. The BRU 14 interfaces with level 1 instruction and data caches 18 and 20, respectively, via an internal address bus 22 and an internal data bus 24. In accordance with the present teachings, an internal second level victim cache 34 is provided on the substrate 12 to increase the on-chip cache capacity and associativity of the processor 10. The victim cache captures all of the lines that are cast out of the L1 caches. Thus, it is kept exclusive from the L1 caches 18 and 20. The victim cache 34 provides two modes of operation. In a first default mode, the victim cache 34 serves as an extension of the level 1 caches 18 and 20. In a second mode, the victim cache 34 serves as a tag storage memory for an optional off-chip level 2 cache 40.

The mode of the victim cache 34 is controlled by control logic 30. The control logic 30 is responsive to a bit stored in a control register 28. The control register 28 receives input from the branch instruction fetch unit 14 via a mode control line 26. The control logic 30 may be implemented with a conventional controller for cache memory with state machines and combinational logic based on system requests and timing parameters for the dual operational modes of the present invention using tag and cache control logic both of which are well known in the art. The output of the control logic 30 and the data bus 24 are interfaced to the optional second level cache 40 (if provided) via a bus interface unit (BIU) 36. A second bus interface unit 38 connects the internal data bus 24 to an external input/output (I/O) devices 42 and off-chip memory 44 via an external data bus 46.

Figure 2A:
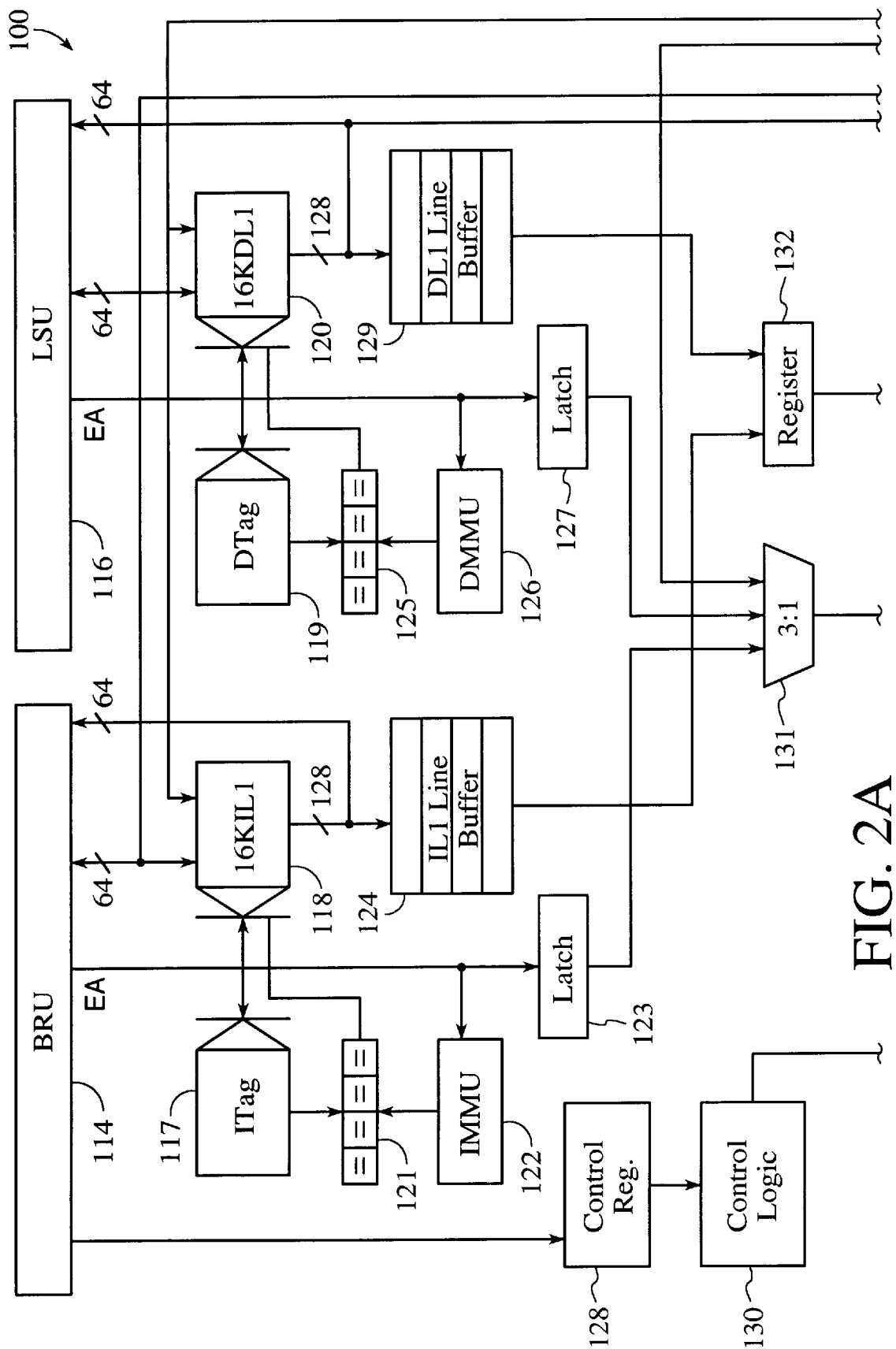
Figure 2B:
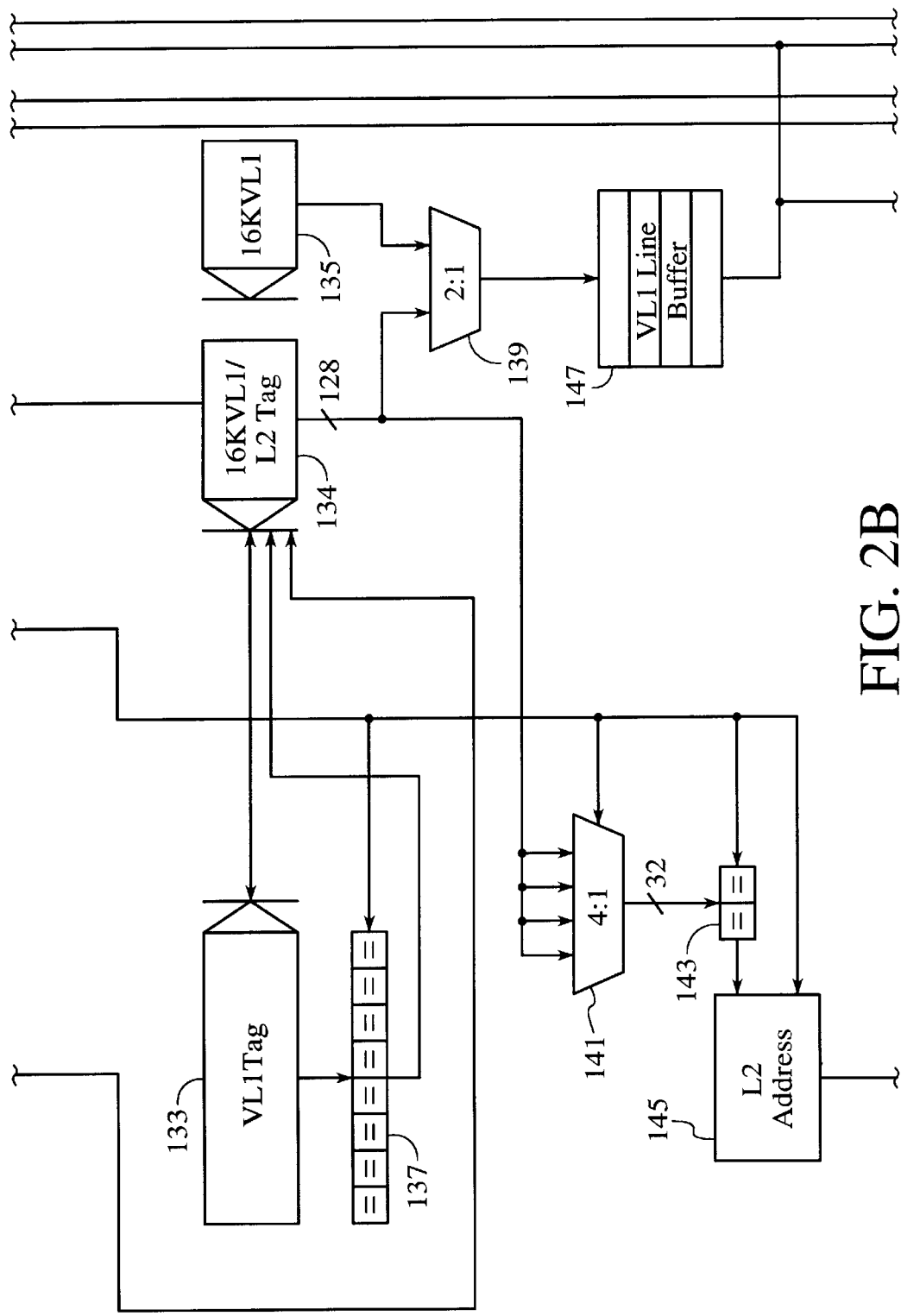
Figure 2C:
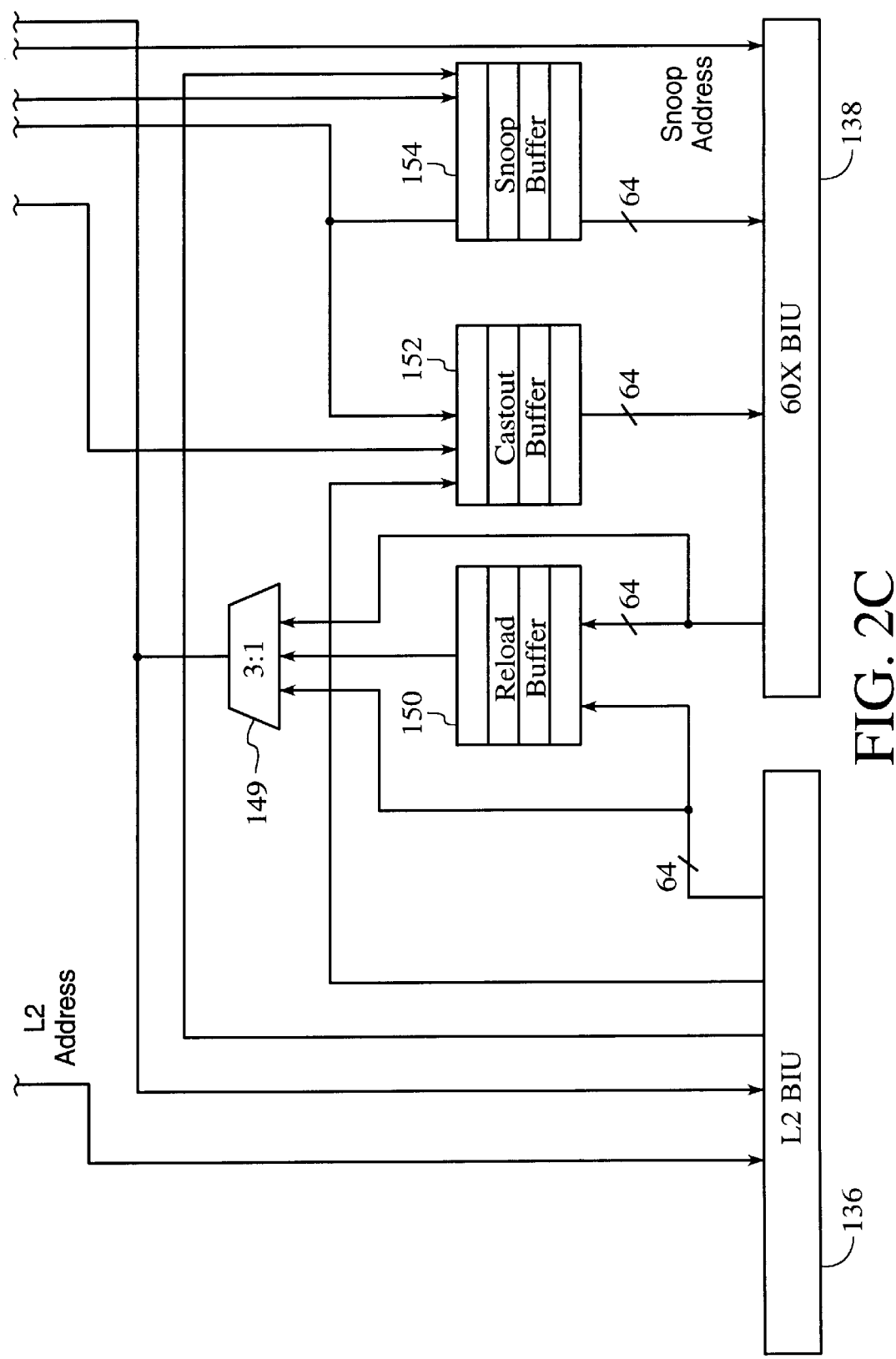

FIGS. 2A–2C are a more detailed implementation of the microprocessor architecture of the present invention. In FIGS. 2A–2C, the microprocessor 100 is shown to include a BRU 114 and an LSU 116. The first level cache is implemented with an instruction cache 118 with associated instruction tag memory 117 and a first level data cache 120 with associated first level cache data cache tag memory 119. The first level instruction tag memory 117 provides an input to a first comparator 121. A second input to the first comparator 121 is provided by an instruction memory management unit (IMMU) 122 in accordance with conventional practice. The result of the comparison is provided to the first level instruction cache memory 118 in accordance with conventional teachings. The BRU 114 output is input to the IMMU 122 and a first latch 123. The output of the instruction cache 118 is stored by a first buffer 124.

The output of the first level data cache tag memory 119 is provided as a first input to a second comparator 125. The second input to the second comparator 125 is provided by a data memory management unit (DMMU) 126 and a second latch 127. The result of the comparison is provided to the first level data cache 120 in accordance with conventional teachings. The output of the first level data cache 120 is stored in a second buffer 129. The outputs of the first and second latches 123 and 127 and the second buffer 129 are input to a 3:1 multiplexer 131. The outputs of the first and second buffers 124 and 129 are stored in a register 132. The output of the multiplexer 131 provides addresses to the second level memory unit comprising a level one victim cache memory tag area 133, a level one memory area/level two tag memory area 134 and a level one memory area 135. The output of the latch 132 is provided to the level one memory area/level two tag area 134. The output of the level one victim cache memory tag area 133 is input to a third comparator 137. A second input to the third comparator 137 is provided by the 3:1 multiplexer 131. The output of the comparator 137 is input to the level one memory area/level two tag memory area 134. The output of the level one memory area/level two tag area 134 is input to a 2:1 multiplexer 139 along with the output of the level one memory area 135. The output of the level one memory area/level two tag area 134 is input to a 4:1 multiplexer 141 which serves to gate same to a fourth comparator 143. A second input to the fourth comparator 143 is provided by 3:1 multiplexer 131. The output of the fourth comparator 143 and the output of the 3:1 multiplexer 131 are input to an address generator 145. The address generator 145 is implemented with combinational logic in a conventional manner. The output of the 2:1 multiplexer 139 is input to a third buffer 147. Conventional reload, castout and snoop buffers 150, 152 and 154 are coupled to a level 2 bus interface unit 136 and a memory and I/O bus interface unit 138. The control register is shown at 128 and the control logic is shown at 130. The output of the control logic 130 is provided to the level one memory area/level two tag area 134.

Figure 3:
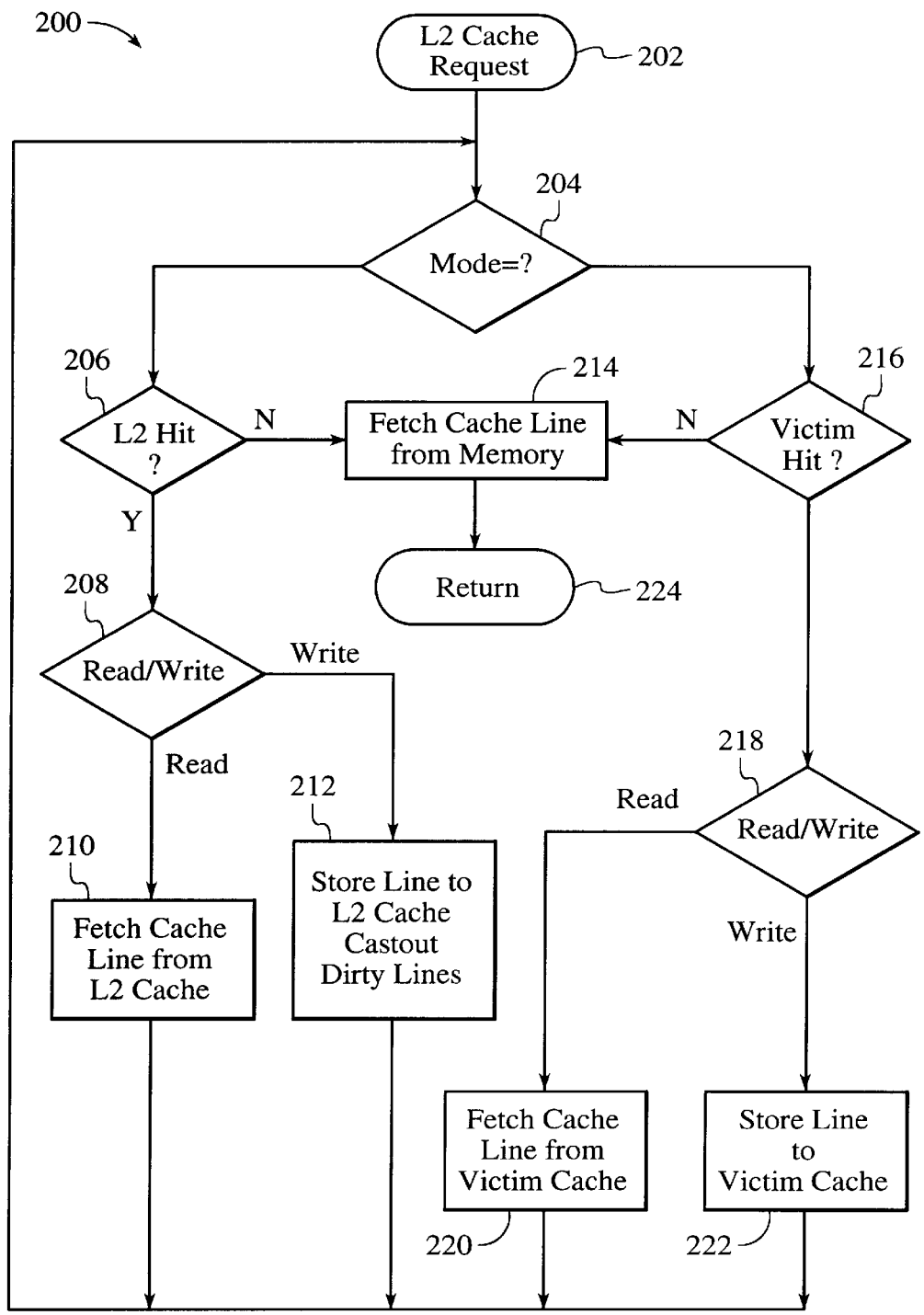
FIG. 3 is an operational flow diagram for the microprocessor architecture of the present invention.

FIG. 3 is an operational flow diagram 200 for the microprocessor architecture of the present invention. As shown in FIG. 3, a control operation is initiated by an L1 cache request (step 202). If (at step 204) the mode bit of the control register 128 is set to 'L2 Tag Mode', then an L2 tag operation is initiated (step 206 et seq.). If the mode bit is set to 'Victim Cache Mode', then a victim cache operation is initiated (step 216 et seq.). For L2 tag operations, the tag array is searched for a valid entry (step 206). If at step 208 there is an L2 read hit, the cache line is fetched from the L2 cache and returned to the L1 cache (step 210). If at step 208 there is an L2 write hit, the cache line is stored to the L2 cache and any dirty lines at that location are castout (step 212). If there is an L2 miss, the data is fetched from memory (step 214).

For victim cache operations, the victim tag array (VL1 Tag) is searched for a valid entry (step 216). If there is a victim read hit, the cache line is fetched from the victim cache and returned to the L1 cache (step 220). If there is a victim write hit, the cache line is stored to the victim cache and any dirty lines at that location are castout (step 222). If there is a victim miss, the data is fetched from memory (step 214).

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

What is claimed is:

1. A microprocessor architecture, the microprocessor architecture including a control means capable of providing a control signal the microprocessor architecture having:

first cache memory means disposed on a first substrate for storing data;

first cache tag memory means disposed on the first substrate for storing data pertaining to the contents of the first cache memory means; and second memory means disposed on the first substrate for storing data in a first mode of operation and for storing information relating to the contents of a second cache memory means in a second mode of operation, wherein the first and second modes of operation are determined by the control means.

2. The invention of claim 1 wherein the first mode of operation comprises a victim cache mode.

3. The invention of claim 1 wherein the second mode of operation comprises a tag store mode.

4. The invention of claim 3 wherein the second cache memory means stores tags for the second cache memory in the tag store mode.

5. The invention of claim 1 wherein the first cache memory means is a level 1 cache memory.

6. The invention of claim 5 wherein the first cache tag memory means is a level 1 cache tag memory.

7. The invention of claim 6 wherein the second cache memory means comprises a level 2 cache memory.

8. The invention of claim 7 wherein the level 2 cache memory is disposed on a second substrate.

9. A microprocessor architecture, the microprocessor architecture including a control means capable of providing a control signal, the microprocessor architecture having:

a level 1 cache memory disposed on a first substrate for storing data;

a level 1 cache tag memory disposed on the first substrate for storing data pertaining to the contents of the level 1 cache memory; and a second memory disposed on the first substrate for storing data in a first mode of operation and for storing information relating to the contents of a level 2 cache memory in a second mode of operation, wherein the first and second modes of operation are determined by the control means.

10. The invention of claim 9 wherein the second memory acts as a victim cache in the first mode of operation.

11. The invention of claim 9 wherein the second memory acts as tag memory in the second mode of operation.

12. The invention of claim 9 wherein the level 2 cache memory is disposed on a second substrate.

* * * * *